W. WINKLESS.
Fire-Escape.
No. 211,875.  Patented Feb. 4, 1879.
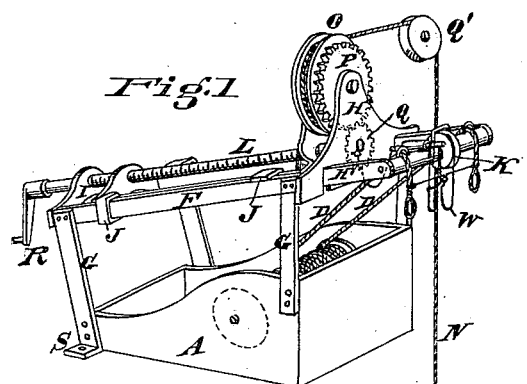
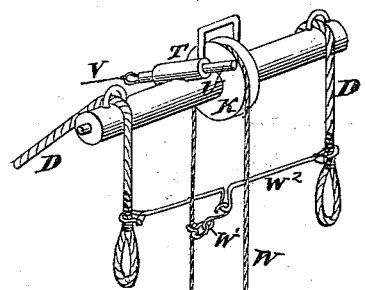
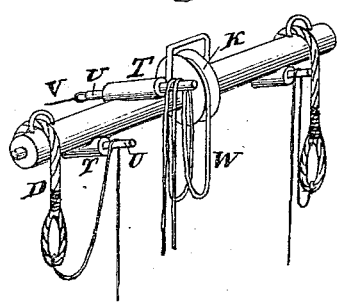
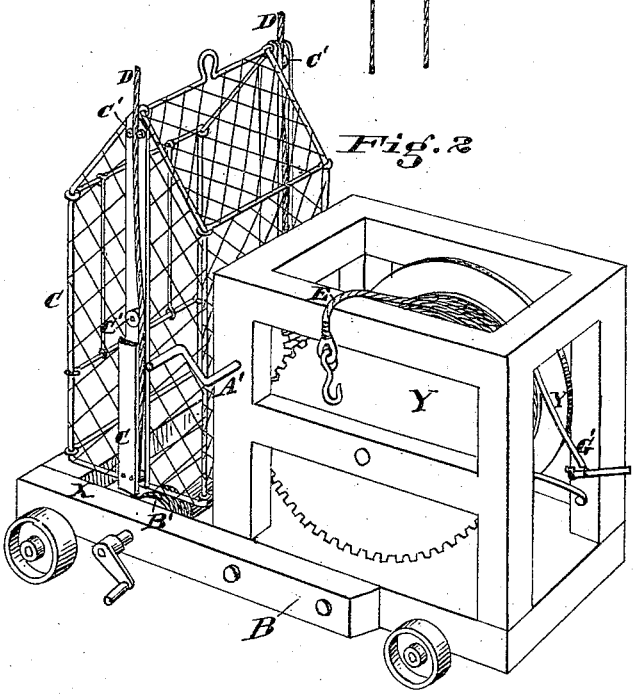
Attest:
Edgar J. Gross
John E. Jones
Inventor
William Winkless
By Ellsworth & Millward
his Attorneys

UNITED STATES PATENT OFFICE.

WILLIAM WINKLESS, OF NEWPORT, KENTUCKY.

IMPROVEMENT IN FIRE-ESCAPES.

Specification forming part of Letters Patent No. 211,875, dated February 4, 1879; application filed July 3, 1878.

*To all whom it may concern:*

Be it known that I, WILLIAM WINKLESS, of Newport, Campbell county, State of Kentucky, have invented certain new and useful Improvements in Fire-Escapes; and I do hereby declare the following to be a full, clear, and exact description of the same, which will enable others skilled in the art to which my invention relates to make and use the same, reference being had to the accompanying drawings, forming part of this specification, in which—

Figure 1 is a perspective view of the upper winch and its attachments. Fig. 2 is a similar view of the lower winch and the cage mounted thereon. Fig. 3 is a detached perspective view of the guide-pulley, guiding-cables, and their connections. Fig. 4 is a modification of the devices shown in Fig. 3. Fig. 5 shows a slit tube-guide for the cable.

My invention has for its object to improve the fire-escape for which Letters Patent of the United States No. 197,709 were granted and issued to me November 27, 1877. In said patent the upper winch-box was provided with folding crane-arms for projecting the cage and guiding the cables and operating-rope, and the lower winch was inclosed in a box. This arrangement I find somewhat objectionable, and therefore propose to remedy it in certain respects.

To this end the invention consists, first, in a frame for the upper winch, adapted to be secured in any convenient position within a room, at a window, under or upon the eaves of a building, or in any other convenient place, and provided with a guide-frame, adapted to be projected and retracted by a screw-connection operated by a crank or a cord from the ground or the lower story of the building. By this means the cage can be suspended clear of the building when required for use, and the arms drawn in out of the way when the cage is not in operation.

It also consists in adapting the movable frame to be projected upon inclined ways, for the purpose of simultaneously extending the cage clear of the building and elevating it to the proper level for the reception of passengers or goods.

It also consists in the employment of a connecting rope or cord for placing the hoisting rope and cables in a position for attachment to the cage, such cord being adapted to be coiled up out of the way when not in use, and to be automatically dropped within reach of the cage or lower winch when the movable frame is projected.

It also consists in the construction of the lower winch-frame, by which it is enabled to receive and carry the cage when the latter is to be moved along the ground.

In the accompanying drawings, A is the upper winch-box; B, the lower winch-box; C, the cage; D, the guiding-cables; and E, the rope for operating the cage, the general arrangement of which is shown in my patent above referred to.

Instead of employing pivoted crane-arms for guiding the cables, as in my patent hereinbefore named, I provide the upper winch-box with inclined ways F, supported by standards G at the corner, and carrying a front upright, H, and rear bar, I, and upon such ways I mount a rectangular sliding frame, H'. This frame is guided upon the ways by clasps or loops J, and its side bars extend forward through the upright a short distance to receive the axle of the idle-pulley K.

The frame is projected and retracted by a long screw-rod, L, having its bearings in the crane-bar or upright of the ways, and working through a threaded opening in the rear cross-piece of the frame, as shown in Fig. 1. The screw-shaft is operated to feed the frame forward by a hand-cord, N, extending from the ground or from the ground-floor of a building over a sleeve or drum, O, having its bearings in the upright H. The drum carries a gear-wheel, P, which engages with a pinion or gear-wheel, Q, on the screw-shaft, so that when the operating-cord is pulled it will turn the shaft and extend the frame. One or more guide-pulleys, Q', may be arranged at suitable points within the building to direct the course of the operating-cord to the required position.

The frame is retreated by a crank, R, on the rear end of the screw-shaft; but a second drum and cord may be arranged upon the winch-box, or in connection with the drum O, for this purpose, such cord being wound upon its drum while the other cord is unwinding from the drum O. The crank R may also be employed for extending the frame, if desired, when the operator is in the room or upon the support carrying the upper winch-box.

The winch-box may be placed within the interior of a building, between two windows in a room, upon a window side, or midway of the window, or upon the exterior of a building, under the eaves, upon the roof, between the window, or in any other convenient place, and the whole apparatus may be used as a fire-escape or for raising and lowering goods or other materials. The upper winch is secured in place in any convenient manner. In this example of the invention I have shown angle-irons S at the rear corner, which may be bolted or secured to the support.

The axle which carries the idle-pulley K is provided upon its upper side with a socket or thimble, T, to receive a loose pin, U, attached by a stout cord, V, to the upright H. The front end of the pin projects through the thimble, and upon it is coiled the connecting-cord W, as shown in Fig. 1, which cord is attached by a second cord, $W^1$, to a cross-piece, $W^2$, connecting the looped ends of the guiding-cables as they hang over the axle of the side pulley, as shown in Fig. 3.

The lower winch-box, B, is made in the form of a stout frame, mounted upon wheels, so it can be easily moved from place to place, and provided with a front platform, X, to support the cage C. It carries a large winch, Y, for the hoisting and lowering rope E, and is geared to an operating crank-shaft, A'. A second winch, B', having its bearings in the platform, serves to receive the yielding cables when the cage is raised or lowered.

When the apparatus is to be operated the lower winch is rolled to the desired point below the upper winch, and the operator either turns the crank R or pulls upon the cord N to turn the drum O, and project the movable frame outward and upward until it carries the guiding-cables and operating-ropes over the cage. As the frame is projected the cord V pulls the pin U from the thimble, thereby detaching the coils of the connecting-cord W, which falls down so as to be reached at the cage. The connecting-cord passing over the idle-pulley K, and being attached to the two guiding-cables, as above explained, is now pulled down to unwind the cables from their winch in the box A and carry them to the cage, along the two opposite sides of which they are guided by the grooved deflecting-pulleys C' to the winch B', and there looped over hooks fastened to such winch. The latter is then turned to draw the cables to the required tension to form the necessary guides for the cage, a pawl and ratchet being connected with the winch to hold it from backward rotation.

Before the cables are attached to the cage the cross-piece $W^2$ is detached and hangs from the connecting-cord. This latter cord is then hooked to the end of the hoisting-rope E, and pulled upon to draw said rope up over the idle-pulley K and back to the cage. The cord is then detached from the pulley and rope and drawn to the ground out of the way, while the hoisting-rope is hooked to the top of the cage.

These connections having been made the apparatus is ready for use, when, by turning the crank A' to wind and unwind the rope E, the cage is raised and lowered on the cables, as will be readily understood.

By employing a projecting and retracting frame with the upper winch, the guide-cables are readily and easily moved out so that the cage shall clear the building as it moves up and down, while the upward inclination given to the frame carries the cage up to a level, or nearly so, with the winch-box, and thereby facilitates the entrance of persons or goods.

A brake, G', consisting of a band and operating-handle, may be applied to the winch Y for graduating the speed with which the cage is lowered; and instead of passing the cables over the axle of the idle-pulley, they may be passed through slit tubes I', attached to the side bars of the sliding frame, as shown in Fig. 5.

Having described my invention, what I claim as new, and desire to secure by Letters Patent, is—

1. The combination of a sliding frame running on side ways, F, supported by posts G upon the upper winch-box, A, and provided with the upright H, to support the pulley O, substantially as and for the purpose set forth.

2. The sliding frame H, adapted to slide outward and upward upon guides F, attached to the winch-box A, combined with the cage C, substantially as and for the purpose specified.

3. The combination of the screw-feed with the movable frame, for projecting and retracting it upon the winch-box, substantially as described.

4. The screw-feed L, to slide the frame H', combined with a drum, O, geared to the screw-shaft, and driven from a point below the winch-box by a hand-cord, N, substantially as described, for the purpose set forth.

5. The combination of the drum O and its operating-cord, the gearing P Q, and the screw-shaft L with the movable frame and winch-box A, substantially as described.

6. The combination of pin U and thimble T with the movable frame and winch-box, or an upright thereon, for holding the connecting-cord when the apparatus is not in use, and for automatically dropping the cord when the frame is extended, substantially as described.

7. The lower winch-box, B, constructed as described, and provided with the winches Y and B' and the cage-platform X, substantially as described, and for the purpose specified.

8. The upper and lower winches, adapted to operate in connection with each other and the cage C, combining with the sliding frame H' the guiding-cables and the cage-rope E, substantially as described, for the purpose specified.

9. The combination of slit tubes I' with the projecting ends of the sliding frame, for receiving and guiding the cables, substantially as described.

In testimony of which invention I hereunto set my hand.

WM. WINKLESS.

Witnesses:
CHARLES BIRD,
JOHN M. CHAPPLE.